Dec. 23, 1969  R. D. COLBURN  3,485,076

ROLL FORMING

Filed Oct. 23, 1967

INVENTOR:
Reuben D. Colburn

By Harold L. Fox
AGENT

United States Patent Office

3,485,076
Patented Dec. 23, 1969

3,485,076
ROLL FORMING
Reuben D. Colburn, Inglewood, Calif., assignor to Northrop Corporation, Beverly Hills, Calif., a corporation of California
Filed Oct. 23, 1967, Ser. No. 677,340
Int. Cl. B21d 5/14, 25/00
U.S. Cl. 72—179                                  2 Claims

ABSTRACT OF THE DISCLOSURE

Apparatus for fabricating sheet metal parts of various cross-sectional configuration whereby the dimensional integrity of certain dimensions of the part is maintained. The apparatus includes a roll stand and at least one pair of mating roll dies having rigid and resilient portions. During a rolling operation, certain portions of a part being fabricated are confined between rigid portions of the roll dies thereby imparting exact dimensions to these parts while noncritical portions are confined between resilient portions of the dies thereby allowing these parts to vary. Thus the dimensional integrity of certain cross-sectional dimensions of a part are maintained.

---

This invention relates generally to the fabrication of sheet material and more particularly to the forming of sheet metal parts by a rolling operation in which the integrity of certain of the cross-sectional dimensions is maintained.

The inherent characteristics of present day structures establish the fact that variations in prefabricated sheet metal parts cannot be tolerated, the foregoing is particularly true of the airframe industry. For example, it is imperative that the tolerance of certain dimensions of stringers and like members be maintained within very close limits if waviness and similar defects are to be eliminated from aircraft components.

The above condition is clearly apparent when near sonic and supersonic aircraft are considered. This condition is further compounded by the fact titanium and other exotic metals must be used in the construction of such aircraft. All these conditions establish the fact that a fast, efficient and extremely accurate method must be found for producing these parts.

Accordingly it is a principal object of the present invention to disclose a facility for fabricating parts of sheet material in which the integrity of certain dimensions therefore is maintained.

Another object is to disclose a facility for fabricating sheet metal parts utilizing a rolling operation including means whereby certain specific cross-sectional dimensions of a part are maintained.

Figure 1:
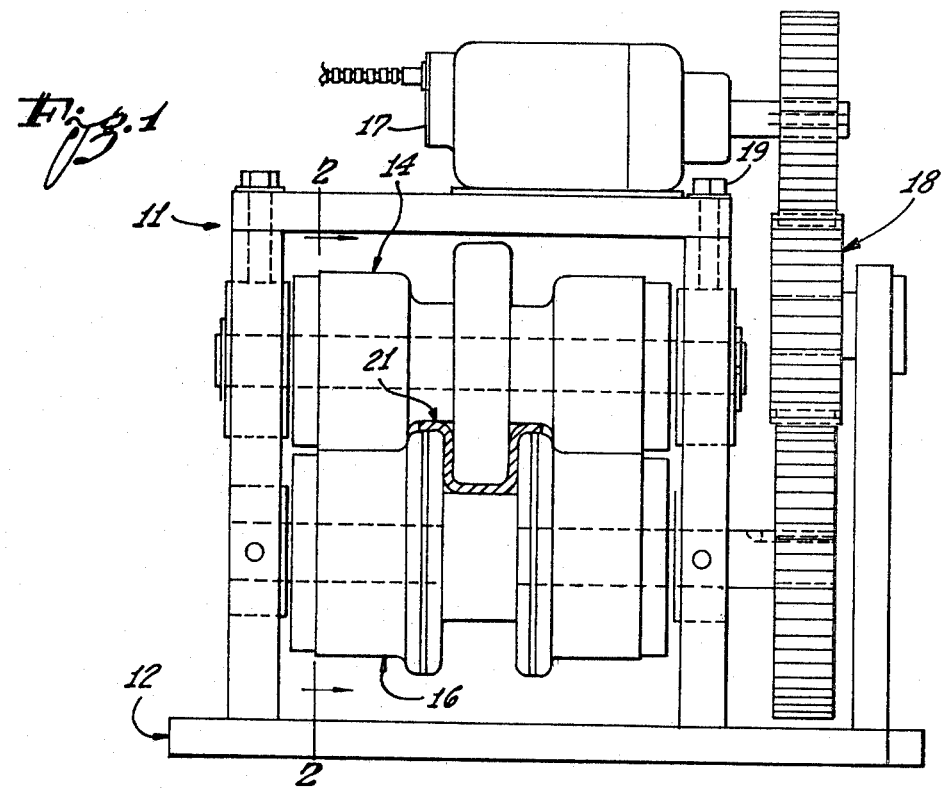

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a front elevational view of a metal fabricating facility of the type disclosed herein.

Figures 2, 3:
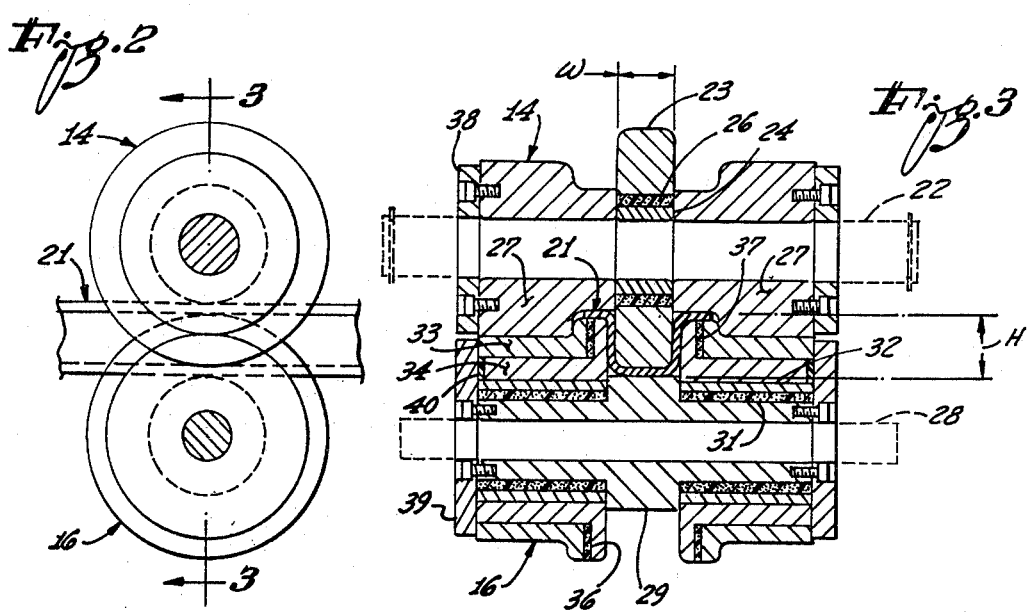

FIGURES 2 and 3 are fragmentary sectional views taken on the lines 2—2 and lines 3—3 of FIGURES 1 and 2, respectively.

Referring to the drawing, FIGURE 1 shows a front elevational view of equipment of the type disclosed herein indicated in its entirety by the numeral 11. Specifically FIGURE 1 shows equipment for forming sheet material, normally sheet metal parts, by a rolling operation, the equipment being quite conventional with the exception of the roll dies utilized.

Briefly, the equipment 11 includes a stand member 12 in which a pair of roll die members 14 and 16 are mounted, the members 14 and 16 being rotatably mounted in the sides of the member 12. The equipment 11 also includes an electric motor 17 driving the members 14 and 16 through a gear train 18. The distance between the axes of the members 14 and 16 is selectively altered by screws 19 located in each side of the stand member 12. FIGURE 1 also shows a metal part 21 of hat shaped configuration in cross-section being fabricated on the equipment 11.

Referring now to FIGURES 2 and 3, here the die members 14 and 16, considered to be of novel construction, are shown in detail. The member 14 is hereinafter referred to as a male die while the member 16 is referred to as a female die. In these figures the members 14 and 16 are shown in their mating relation and the part 21 being fabricated by the equipment 11 positioned between the members 14 and 16.

Each of the members 14 and 16 constitutes a built-up structure. The male die member 14 includes a shaft 22 on which the various components comprising the member 14 are mounted. Mounted on the shaft 22, at the mid-point thereof, is a disc-like member 23. The member 23 is resiliently mounted by means of metallic and resilient bushings members 24 and 26, respectively. Numerous materials may be used in the construction of the member 26, resilient material sold under the trade name of Adiprene being the most satisfactory to date. Also mounted on the shaft 22, on each side of the members 23, 24 and 26, are stepped forming members 27—27. The members 23 and 27—27 are of cylindrical configuration and as mounted in working relation on the shaft 22 cooperate with each other to contour or shape the part 21.

The female die member 16 includes a shaft 28 on which the various components comprising the member 16 are mounted. Rigidly mounted on the shaft 28, having a coextensive relation with the die 14 as assembled on the shaft 22, is a foundation member 29. The configuration of the member 29 is further characterized in that its central portion is of greater diameter than its ends, as best seen in FIGURE 3. The member 29 cooperates with the member 23 in a manner presently explaining in shaping the part 21. Positioned on each end of the member 29 are resilient and metal bushings 31 and 32, respectively. Mounted on each of the bushings 32 are a pair of annular members 33 and 34, L-shaped in cross-section, including long and short legs having a parallel and normal relation with respect to the axis of the shaft 28. As mounted on the bushings 32 it will be seen that the inner end of the member 34 has a flush relation with the central portions of the member 29 while the member 33 terminates short of the aforementioned flush relationship with the central portion of the member 29, defining a space in which washer-like members 36 and 37 are mounted. Disc-like members 38 and 39 are secured to each end of the die members 14 and 16, as best seen in FIGURE 3.

It will also be noted, by referring to FIGURE 3, that the member 34 terminates short of the disc-members 38 and 39 defining a space in which a washer-like resilient member 40 is positioned. Thus it will be seen that both of the members 34 are free to move longitudinally with respect to the central portion of the member 29.

It will be understood that all components of the members 14 and 16, viz, components 23, 27, 29, 33 and 34 and all bushings associated therewith, are of cylindrical configuration. The components 27 and 29 are fixedly mounted on the shafts 22 and 28, in other words resilience movement therebetween is not present as a part is being formed on the equipment 11. In contrast the components 23, 33 and 34 are resiliently mounted for limited radial or longitudinal movement on the shafts 22 and 28, the resilient material of which the bushings 26 and 31 are constructed make the aforementioned radial movement possible while the members 36, 37 and 40 allow longitudinal movement. The bushings members 26 and 31, also the members 36, 37 and 40, may be constructed of any resilient material, Adiprene being the most satisfactory material developed to date.

The various components comprising the equipment 11 having been described, the manner in which they co-operate in fabricating a structural part will now be described. In this respect it is assumed that a structural member 21, of hat-shaped cross-section, is to be fabricated on the equipment. Further it is assumed that the inside web dimension of the section 21, indicated by the letter W, and its overall height indicated by the letter H, in FIGURE 3 are critical dimensions and must be maintained within very close limits. It will also be recognized by those familiar with the art that a plurality of passes have previously been performed on the strip of metal from which the member 21 is to be fabricated, prior to the final pass in which the member 21 is caused to assume its final shape and dimensions.

The final step or pass of the forming operation is effected by the die rolls 14 and 16 having the relation as best seen in FIGURE 3. Referring to this figure (FIGURE 3), it will be seen that portions of the member 21, determining its over-all height H, are confined between the rigid members 27 and 29 and therefore remain constant. The resilient bushing 26, acting through the member 23, will insure the lower end of the web of the member 21 being urged into a firm contacting relation with the member 29. Similarly the resilient members 31, acting through the members 33 and 34, insures that the top of the member 21 will be urged into a firm contacting relation with the members 27.

Similarly the resilient members 36, 37 and 40 insure that the web of section will be urged into firm contacting relation with the member 23. As the member 23 is constructed of non-compressible material it insures that the inside width of the web W will be the same as that of the width of the member 23.

In view of the above, it will be appreciated that variations in the wall thickness of the member 21 may occur, made possible by the resilient members 26, 31, 36, 37 and 40, however, the integrity of the dimensions W and H—critical dimensions—will be maintained, the bushings 26 and 31 allowing variations in wall thickness in a radial direction while the members 36, 37 and 40 allow variations in vertical wall thickness to occur.

Thus it is seen that the role dies 14 and 16 co-operate to insure that dimensional integrity of certain dimensions of a part being fabricated thereon will be maintained.

I claim:
1. Roll forming apparatus adapted to have a generally elongated member of hat-shaped cross-section fabricated thereon comprising:
   (a) a stand-like supporting structure;
   (b) male and female die members generally of cylindrical configuration and of symmetrical construction with respect to the individual axes and being rotatably mounted in said supporting structure in approximately tangential relation;
   (c) means in said supporting structures functioning to vary the distance between the axes of said die members;
   (d) means functioning to impart rotational movement to at least one of said die members;
   (e) said male and female die members each including first portions having a fixed relation with respect to the respective axis of said die members;
   (f) said male die member including at least a portion adapted to be moved in a radial direction with respect to the axis of said male die member;
   (g) and said female die member including portions adapted to be moved radially and longitudinal with respect to the axis of said female die member whereby dimensions defining the inside width and overall height of a web member being fabricated on the apparatus are maintained within very close limits.
2. Apparatus as set forth in claim 1:
   (a) in which the movable portions of said male and female die members have normal positions with respect to said fixed portions of said male and female die members and in which movement thereof is made possible by resilient members comprising components of said male and female die members.

References Cited

UNITED STATES PATENTS 1,360,450  11/1920  Scott _____ 72—179

FOREIGN PATENTS 1,184,726  1/1965  Germany.

CHARLES W. LANHAM, Primary Examiner

LOWELL A. LARSON, Assistant Examiner

U.S. Cl. X.R.

72—465